United States Patent
Arai et al.

(10) Patent No.: US 8,962,734 B2
(45) Date of Patent: Feb. 24, 2015

(54) PHENOL RESIN MOLDING MATERIAL AND PULLEY MOLDED FROM SAID MOLDING MATERIAL

(75) Inventors: Hirokazu Arai, Osaka (JP); Keiji Asai, Nobeoka (JP)

(73) Assignee: JTEKT Corporation, Osaka (JP)

( * ) Notice: Subject to any disclaimer, the term of this patent is extended or adjusted under 35 U.S.C. 154(b) by 2423 days.

(21) Appl. No.: 10/591,516

(22) PCT Filed: Jan. 25, 2005

(86) PCT No.: PCT/JP2005/001313
§ 371 (c)(1),
(2), (4) Date: Aug. 8, 2007

(87) PCT Pub. No.: WO2005/083001
PCT Pub. Date: Sep. 9, 2005

(65) Prior Publication Data
US 2011/0046288 A1  Feb. 24, 2011

(30) Foreign Application Priority Data
Mar. 1, 2004 (JP) ................................ 2004-056634

(51) Int. Cl.
*C08K 7/18* (2006.01)
*C08K 7/14* (2006.01)
*C08L 61/06* (2006.01)
C08L 9/02 (2006.01)
C08L 21/00 (2006.01)
C08L 35/04 (2006.01)
F16H 55/48 (2006.01)

(52) U.S. Cl.
CPC . *C08L 61/06* (2013.01); *C08L 9/02* (2013.01); *C08L 21/00* (2013.01); *C08L 35/04* (2013.01); *F16H 55/48* (2013.01)
USPC .......................................... 524/494; 524/493

(58) Field of Classification Search
CPC ............. C08L 59/00; C08L 9/00; C08K 7/14; C08K 9/08; C08K 9/04
USPC .............. 242/155 R; 254/213, 226, 242, 266, 254/390, 902; 524/492, 493, 494, 611, 847
See application file for complete search history.

(56) References Cited

U.S. PATENT DOCUMENTS 5,064,881 A * 11/1991 Togashi et al. ................ 523/443
5,797,819 A    8/1998 Arai
6,716,907 B2 * 4/2004 Asai et al. ..................... 524/494
2002/0123557 A1 * 9/2002 Asai et al. ..................... 524/493
2003/0130438 A1 * 7/2003 Amagai et al. ................ 525/370

FOREIGN PATENT DOCUMENTS

| EP | 0 794 361 A1 | 9/1997 | |
|---|---|---|---|
| EP | 1 219 681 A1 | 7/2002 | |
| JP | 60-124646 | 7/1985 | |
| JP | 1-172446 | 7/1989 | |
| JP | 9-217818 | 8/1997 | |
| JP | 11-49930 | 2/1999 | |
| JP | 2000-219797 | 8/2000 | |
| JP | 2002-201335 | 7/2002 | |
| JP | 2003-268197 | 9/2003 | |
| JP | 2003268197 A * | 9/2003 | .............. C08L 61/06 |

OTHER PUBLICATIONS

International Search Report, dated Apr. 26, 2005, corresponding to PCT/JP2005/001313.
Patent Abstracts of Japan, Publication 60124646 A, Published Jul. 3, 1985, in the name of Aso, et al.
Patent Abstracts of Japan, Publication 01172446 A, Published Jul. 7, 1989, in the name of Kato, et al.
Patent Abstracts of Japan, Publication 09217818 A, Published Aug. 19, 1997, in the name of Arai.
Patent Abstracts of Japan, Publication 2000219797 A, Published Aug. 8, 2000, in the name of Kashiwa, et al.
Patent Abstracts of Japan, Publication 2002201335 A, Published Jul. 19, 2002, in the name of Asai, et al.
Patent Abstracts of Japan, Publication 2003268197 A, Published Sep. 25, 2003, in the name of Koizumi.
Supplementary European Search Report for EP 05 70 4309 dated Jul. 12, 2012, 3pp.

* cited by examiner

*Primary Examiner* — Ling Choi
*Assistant Examiner* — Chun-Cheng Wang
(74) *Attorney, Agent, or Firm* — Christie, Parker & Hale, LLP.

(57) ABSTRACT

Disclosed is a phenol resin molding material comprising 100 parts by weight of a resol type phenol resin, 40 to 100 parts by weight of an inorganic fiber, 30 to 90 parts by weight of a natural silica powder having an average particle size of 0.5 to 15 μm and subjected to a coupling agent treatment and 1 to 15 parts by weight of a rubber component as main components. The molding material can contain 50% by weight or more of a glass fiber and a natural silica powder having a crushed shape can be used as the natural silica powder. As a molded article produced from the resin molding material, a resin pulley is exemplified.

2 Claims, No Drawings

PHENOL RESIN MOLDING MATERIAL AND PULLEY MOLDED FROM SAID MOLDING MATERIAL

CROSS-REFERENCE TO RELATED APPLICATION

This application is a National Phase Patent Application of International Application Number PCT/JP2005/001313, filed on Jan. 25, 2005, which claims priority of Japanese Patent Application Number 2004-056634, filed on Mar. 1, 2004.

TECHNICAL FIELD

The present invention relates to a phenol resin molding material used in automobile engine components and, more particularly, to a phenol resin molding material having improved abrasion resistance, especially improved resistance to dust of abrasion, and a resin pulley molded from said material.

BACKGROUND ART

A phenol resin molding material is excellent in heat resistance and dimensional stability and is therefore used as a substitute for metal in various fields. In the automobile field, the material of various components has been changed to a resin due to new requirements such as size reduction, weight saving and cost reduction. In particular, a conventional pulley made exclusively of metal has been replaced by a resin pulley and pulleys having various shapes have been molded. The resin pulley had a drawback that, when used in the state where there is dust between the pulley and a rubber belt, the surface in contact with the belt is likely to be abraded and the resin pulley is inferior in durability as compared with a conventional metal pulley. Therefore, there has been proposed a resin pulley in which abrasion resistance and heat cycle resistance are improved by mixing the phenol resin with a natural silica powder having an average particle size of 20 to 150 μm (for an example, see Japanese Unexamined Patent Publication (Kokai) No. 2002-201335).

Although the dust resistance is improved, the resin pulley has a problem that a large load is applied to production facilities such as molds and molding machines because the silica powder has a large particle size to provide excellent abrasion resistance, resulting in a short life of the facilities. Thus, a further improvement has been required.

DISCLOSURE OF THE INVENTION

In light of the above problems of the prior art, the present inventors have intensively studied and found that it is possible to maintain abrasion resistance and heat shock resistance of a molded article, especially a pulley, and to ensure a long life of production facilities, by mixing a phenol resin molding material with a resol-type phenol resin, an inorganic fiber, a natural silica powder having an average particle size of 0.5 to 15 μm and subjected to a coupling agent treatment, and a rubber component in a specific mixing ratio. Thus, the present invention has been completed.

That is, the first feature of the present invention is that a phenol resin molding material comprises 100 parts by weight of a resol type phenol resin, 40 to 100 parts by weight of an inorganic fiber, 30 to 90 parts by weight of a natural silica powder having an average particle size of 0.5 to 15 μm and subjected to a coupling agent treatment, and 1 to 15 parts by weight of a rubber component as main components. The second feature of the present invention is that the inorganic fiber contains 50% by weight or more of a glass fiber, and the third feature of the present invention is that the natural silica powder has a crushed shape. The present invention is also directed to a resin pulley molded from the phenol resin molding material having each of the above features.

DETAILED DESCRIPTION OF THE INVENTION

The phenol resin molding material for a pulley, of the present invention, will now be described in detail.

The resol-type phenol resin used in the present invention may be a dimethylene ether-type or a methylol-type phenol resin, and may be a solid or a liquid. For the purpose of improving heat shock resistance, a solid resol-type phenol resin having an average molecular weight of 600 to 800 is preferably used. This resol-type phenol resin has an action of uniformly dispersing a rubber component to be mixed as a stress relaxing material in the present invention, and also has an action of decreasing a molding pressure during injection molding thereby to decrease the residual stress of a pulley and thus to improve the heat shock resistance.

In the specification of the present invention, a quantitative ratio of the phenol resin molding material is represented by "parts by weight" unless otherwise specified.

The rubber component used in the present invention is not specifically limited, and nitrile rubber, acryl rubber, chloroprene rubber, styrene-butadiene rubber and silicone rubber are preferable. These rubber components may be used alone or in combination. The amount of the rubber component is preferably from 1 to 15 parts by weight based on 100 parts by weight of the phenol resin. In order to improve heat shock resistance by exerting the stress relaxing effect, the amount is preferably more than 1 part by weight. In order to prevent deterioration of resistance to dust of abrasion due to a drastic decrease in surface hardness of the product while maintaining large stress relaxing effect, the amount is preferably 15 parts by weight or less.

As the inorganic fiber in the present invention, there can be used glass fiber, carbon fiber, silicon carbide fiber, or whiskers such as potassium titanate fiber. These inorganic fibers may be used alone or in combination. In particular, an inorganic fiber containing 50% by weight or more of a glass fiber is preferable in view of strength, heat resistance and cost. For the purpose of improving adhesion with a phenol resin, the glass fiber is preferably subjected to a surface treatment with a coupling agent (silane coupling agent or titanate-based coupling agent).

In the present invention, this inorganic fiber is mixed in the amount of 40 to 100 parts by weight based on 100 parts by weight of the phenol resin. In order to enhance the reinforcing effect, in practical use in a pulley, the amount is preferably more than 40 parts by weight. In order to prevent an increase in damage to a rubber belt, the amount is preferably 100 parts by weight or less.

In the present invention, a natural silica powder having an average particle size of 0.5 to 15 μm and subjected to a coupling agent treatment, is used. The natural silica is classified into a crystal silica and an amorphous fused silica by its crystalline state and the natural silica powder has a crushed shape and a circular particle shape. In particular, a natural silica having a crushed shape has an increased surface area, to be bonded with the resin, because the surface has irregularities.

Examples of the coupling agent used to carry out a treatment (surface treatment) of the natural silica powder in the present invention include silane-based coupling agents and titanate-based coupling agents.

As the silane-based coupling agent, for example, there can be used vinyltrichlorosilane, vinyltriethoxysilane, vinyltrimethoxysilane, γ-methacryloxypropyltrimethoxysilane, β(3,4-epoxycyclohexyDethyltrimethoxysilane, γ-glycidoxypropyltrimethyldiethoxysilane, γ-glycidoxypropylmethyldiethoxysilane, N-β(aminoethyl)γ-aminopropyltrimethoxysilane, Nβ(aminoethyl)γ-aminopropylmethyldimethoxysilane, γ-aminopropyltriethoxysilane, N-phenyl -γ-aminopropyltrimethoxysilane, γ-mercaptopropyltrimethoxysilane and γ-chloropropyltrimethoxysilane. These silane-based coupling agents can be used alone or in combination.

As the titanate-based coupling agent, for example, there can be used isopropyltriisostearoyl titanate, tetraoctylbis(ditridecylphosphite)titanate, tetra(2,2-diallyloxymethyl-1-butyl)bis(ditridecyl)phosphate titanate, isopropyltri(N-aminoethyl-aminoethyl) titanate, bis(dioctyl pyrophosphate) oxyacetate titanate, isopropyltrioctanoyl titanate, isopropyltris(dioctylpyrophosphate)titanate, isopropyldimethacrylisostearoyl titanate, isopropyltridodecylbenzenesulfonyl titanate, isopropylisostearoyldiacryl titanate, tetraisopropylbis(dioctylphosphite)titanate and isopropyltricumylphenyl titanate. These titanate-based coupling agents can be used alone or in combination.

Although either the silane-based coupling agent or titanate-based coupling agent may be used, the silane-based coupling agent is more preferable.

Furthermore, by carrying out the coupling agent treatment, it is possible to improve adhesion with the phenol resin and to prevent loss of silica powder, due to frictional resistance, during the operation of the pulley. In order to enhance the effect of improving surface hardness of the material and preventing deterioration of dust resistance, the average particle size of the silica powder is preferably more than 0.5 μm. In order to improve abrasion resistance of the pulley and to reduce a load on production facilities such as molds and injection molding machines used during molding of the pulley, to thereby prevent a decrease in life of the facilities due to abrasion, the average particle size of the silica powder is preferably less than 15 μm.

The amount of the coupling agent to be mixed is preferably from 0.5 to 3 parts by weight based on 100 parts by weight of the silica powder. In order to accelerate integration of the natural silica powder with the resin to thereby improve the adhesive strength and to exert a sufficient effect such as abrasion resistance, the amount of the coupling agent is preferably more than 0.5 parts by weight. In order to prevent deterioration of appearance of the resulting product, the amount is preferably 3 parts by weight or less.

The natural silica powder is mixed in the amount of 30 to 90 parts by weight based on 100 parts by weight of the phenol resin. In order to prevent insufficient content of the silica powder on the surface of the pulley and to thereby exert a sufficient effect on abrasion resistance, the amount of the natural silica powder is preferably more than 30 parts by weight. In order to prevent a decrease in adhesion between the phenol resin and the silica powder due to a decrease in a relative amount of the resin, to thereby suppress loss of silica powder from the surface of the pulley, the amount of the natural silica powder is preferably 90 parts by weight or less.

As described above, in the present invention, an expected object can be achieved by a resin composition comprising a resol type phenol resin, an inorganic fiber, a natural silica powder having an average particle size of 0.5 to 15 μm and subjected to a coupling agent treatment, and a rubber component in a specific mixing ratio, that is, a combination of the respective constitutions.

To the molding material of the present invention, there can be optionally added various additives which are used commonly in a conventional phenol resin molding material, for example, releasants such as calcium stearate; curing accelerators such as magnesium oxide; hindered phenol-based antioxidants; hindered amine-based photostabilizers; benzotriazole-based ultraviolet absorbers; and colorants. Furthermore, to the molding material of the present invention, organic fibers including cotton cloth fiber and aramid fiber can be added as far as the object of the present invention is not adversely affected. The molding material of the present invention can be produced by heat-kneading using a pressure kneader, a twin screw extruder, a Henschel mixer or a mixing heated roll and crushing using a power mill and a pulley having a desired shape can be molded by a known molding method, for example, injection molding, transfer molding or compression molding.

BEST MODE FOR CARRYING OUT THE INVENTION

Examples of the resent invention will now be described, but the present invention is not limited to these examples. The respective characteristics were evaluated by the following procedures.

(1) Spiral flow

A spiral-shaped molded article was made by transfer molding, and the length of the spiral was taken as a spiral flow value.

Mold: pot diameter of 100 mm, pitch of 18 mm and length of 1000 mm

Molding conditions: mold temperature of 165° C., molding pressure of 5.3 MPa and sample of 50 g (2) Bending strength, bending elastic modulus In accordance with JIS K 6911, bending strength and bending elastic modulus were measured.

(3) Rockwell hardness

In accordance with JIS K 6911, Rockwell hardness was measured.

(4) Rough abrasion volume

In an abrasion test in accordance with JIS K 7204, volume loss after 2,000 rotations was measured.

(5) Pulley dust test (pulley abrasion, damage to belt)

A pulley dust test was conducted under the conditions of a dust amount of 1 kg/m$^3$, a rotation number of 0 to 7,000 rpm and a load of 980 N and the abrasion state was measured after operating for 400 hours. The case where no abrasion is observed at the peripheral groove portion of a pulley as a sliding surface with a rubber belt was rated "Good", whereas, the case where abrasion is observed at the peripheral groove portion of the pulley was rated "Poor". With respect to damage to a rubber belt, the case where no damage was observed was rated "Good", whereas, the case where damage was observed was rated "Poor".

(6) Heat shock resistance

After repeating 1,000 heating cycles (each cycle comprising maintaining at −40° C. and at 120° C. for 30 minutes), it was confirmed whether or not cracking occurred. The case where no cracking occurred was rated "Good", whereas, the case where cracking occurred was rated "Poor".

(7) Nozzle tip abrasion

To an injection molding machine, a convenient nozzle tip (material: S-45C) was mounted and a material was molded 300 times (100 g/shot). The abrasion amount of a nozzle tip was measured.

EXAMPLE 1

100 parts by weight of a dimethylene ether type resol resin [manufactured by Asahi Organic Chemicals Industry Co., Ltd., number average molecular weight: 800], 75 parts by weight of a glass fiber [manufactured by Nippon Electric Glass Co., Ltd.], 65 parts by weight of a natural silica powder [manufactured by Tatsumori Ltd., average particle size: 1.5 μm, previously subjected to a coupling agent treatment], 12 parts by weight of a nitrile rubber [manufactured by JSR Corporation, PNC-38], 6 parts by weight of calcium hydroxide, 5 parts by weight of magnesium oxide and 5 parts by weight zinc stearate were uniformly mixed, uniformly heat-kneaded using a heated roll to form a sheet. The sheet was cooled and then crushed to obtain a granulated molding material.

The resulting molding material was subjected to injection molding under the following conditions:
Cylinder temperature: front portion at 85° C. and rear portion at 50° C.,
Mold temperature: 180° C., and
Curing time: 60 seconds With respect to the resulting test pieces, bending strength, bending elastic modulus, Rockwell hardness and rough abrasion volume were measured. With respect to the resulting pulley, pulley abrasion resistance and damage to a belt were evaluated, by a pulley dust test, and also heat shock resistance was evaluated. With respect to nozzle tip abrasion, after making test pieces, each test nozzle tip was mounted and only injection of the material was repeated for 300 times. All the material adhered onto the nozzle tip was removed and a difference in weight before and after the test was taken as an abrasion amount of the nozzle tip. The results are shown in Table 1.

EXAMPLES 2 TO 3 AND COMPARATIVE EXAMPLES 1 TO 10

In the same manner as in Example 1, except that the formulation was changed as shown in Table 1, molding materials were prepared and the respective test pieces and pulleys were produced, and then the performances were evaluated. The results are shown in Table 1.

As is apparent from the results shown in Table 1, molded articles formed of the phenol resin molding material of the present invention in Examples 1 to 3 are excellent in dust resistance because no abrasion was observed in the pulley dust test, and are also excellent in heat shock resistance because no cracking occurred in the heat shock resistance test.

It was confirmed that the molded articles are practically excellent because the abrasion amount was reduced to 1/10 to 1/50 of the abrasion amount found in the Comparative Examples in the nozzle tip abrasion test, and also has large load reducing effect. When a natural silica powder having an average particle size of 25 to 150 μm was used in Comparative Examples 1 to 6, regardless of the coupling agent treatment, the abrasion amount of the nozzle tip was large and there arose a problem of the life of the facilities. When a natural silica powder having an average particle size of 0.5 to 10 μm which is not subjected to a coupling agent treatment was used in Comparative Examples 7 to 9, an abrasion volume was large and abrasion was observed in the pulley dust test and also the dust resistance was inferior. When a natural silica powder having an average particle size of less than 0.5 μm was used in Comparative Example 10, spiral flowability and dust resistance were inferior and pulley abrasion was particularly inferior.

According to the present invention, a resin pulley having excellent dust resistance can be obtained without applying a load on the production facilities and, thus, this remarkably promotes replacement of a metal pulley, for automobiles and industrial machinery which require weight reduction, by the resin pulley.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Dimethylene ether type resol resin | 100 | 100 | 100 | 100 | 100 | 100 | 100 |
| Glass fiber | 75 | 75 | 75 | 75 | 75 | 75 | 75 |
| Natural silica powder 0.5 μm (coupling agent treated product) | 65 | — | — | — | — | — | — |
| Natural silica powder 1.5 μm (coupling agent treated product) | — | 65 | — | — | — | — | — |
| Natural silica powder 10 μm (coupling agent treated product) | — | — | 65 | — | — | — | — |
| Natural silica powder 25 μm (coupling agent treated product) | — | — | — | 65 | — | — | — |
| Natural silica powder 50 μm (coupling agent treated product) | — | — | — | — | 65 | — | — |
| Natural silica powder 150 μm (coupling agent treated product) | — | — | — | — | — | 65 | — |
| Natural silica powder 25 μm (coupling agent treated product) | — | — | — | — | — | — | 65 |
| Natural silica powder 50 μm (coupling agent treated product) | — | — | — | — | — | — | — |
| Natural silica powder 150 μm (coupling agent treated product) | — | — | — | — | — | — | — |
| Natural silica powder 0.5 μm (coupling agent treated product) | — | — | — | — | — | — | — |
| Natural silica powder 1.5 μm (coupling agent treated product) | — | — | — | — | — | — | — |
| Natural silica powder 10 μm (coupling agent treated product) | — | — | — | — | — | — | — |

TABLE 1-continued

| | | | | | | | |
|---|---|---|---|---|---|---|---|
| Natural silica powder 0.2 μm (coupling agent treated product) | — | — | — | — | — | — | — |
| Nitrile rubber | 12 | 12 | 12 | 12 | 12 | 12 | 12 |
| Calcium hydroxide | 6 | 6 | 6 | 6 | 6 | 6 | 6 |
| Magnesium oxide | 5 | 5 | 5 | 5 | 5 | 5 | 5 |
| Zinc stearate | 5 | 5 | 5 | 5 | 5 | 5 | 5 |
| Spiral flow (mm) | 420 | 500 | 520 | 480 | 480 | 520 | 475 |
| Bending strength (MPa) | 163 | 166 | 158 | 156 | 153 | 135 | 162 |
| Bending elastic modulus (MPa) | 13,800 | 14,000 | 13,500 | 14,200 | 13,800 | 13,400 | 14,100 |
| Rockwell hardness (M scale) | 101 | 101 | 100 | 99 | 99 | 97 | 100 |
| Rough abrasion volume (mm$^3$) | 38.2 | 36.5 | 33.6 | 34.7 | 36.2 | 35.9 | 32.3 |
| Pulley dust test | | | | | | | |
| Pulley abrasion resistance | good | good | good | good | good | good | good |
| Attack on belt | good | good | good | good | good | good | good |
| Heat shock resistance | good | good | good | good | good | good | good |
| Nozzle tip abrasion amount (mg) | 0.02 | 0.03 | 0.06 | 0.66 | 0.83 | 1.07 | 0.72 |

| | Comparative Example 5 | Comparative Example 6 | Comparative Example 7 | Comparative Example 8 | Comparative Example 9 | Comparative Example 10 |
|---|---|---|---|---|---|---|
| Dimethylene ether type resol resin | 100 | 100 | 100 | 100 | 100 | 100 |
| Glass fiber | 75 | 75 | 75 | 75 | 75 | 75 |
| Natural silica powder 0.5 μm (coupling agent treated product) | — | — | — | — | — | — |
| Natural silica powder 1.5 μm (coupling agent treated product) | — | — | — | — | — | — |
| Natural silica powder 10 μm (coupling agent treated product) | — | — | — | — | — | — |
| Natural silica powder 25 μm (coupling agent treated product) | — | — | — | — | — | — |
| Natural silica powder 50 μm (coupling agent treated product) | — | — | — | — | — | — |
| Natural silica powder 150 μm (coupling agent treated product) | — | — | — | — | — | — |
| Natural silica powder 25 μm (coupling agent treated product) | — | — | — | — | — | — |
| Natural silica powder 50 μm (coupling agent treated product) | 65 | — | — | — | — | — |
| Natural silica powder 150 μm (coupling agent treated product) | — | 65 | — | — | — | — |
| Natural silica powder 0.5 μm (coupling agent treated product) | — | — | 65 | — | — | — |
| Natural silica powder 1.5 μm (coupling agent treated product) | — | — | — | 65 | — | — |
| Natural silica powder 10 μm (coupling agent treated product) | — | — | — | — | 65 | — |
| Natural silica powder 0.2 μm (coupling agent treated product) | — | — | — | — | — | 65 |
| Nitrile rubber | 12 | 12 | 12 | 12 | 12 | 12 |
| Calcium hydroxide | 6 | 6 | 6 | 6 | 6 | 6 |
| Magnesium oxide | 5 | 5 | 5 | 5 | 5 | 5 |
| Zinc stearate | 5 | 5 | 5 | 5 | 5 | 5 |
| Spiral flow (mm) | 480 | 530 | 470 | 490 | 510 | 280 |
| Bending strength (MPa) | 158 | 142 | 160 | 159 | 152 | 143 |
| Bending elastic modulus (MPa) | 14,000 | 13,800 | 14,000 | 14,000 | 13,900 | 13,900 |
| Rockwell hardness (M scale) | 99 | 97 | 101 | 101 | 100 | 102 |
| Rough abrasion volume (mm$^3$) | 33.0 | 31.8 | 69.5 | 64.8 | 53.2 | 68.2 |
| Pulley dust test | | | | | | |
| Pulley abrasion resistance | good | good | poor | poor | poor | poor |
| Attack on belt | good | good | good | good | good | good |
| Heat shock resistance | good | good | good | good | good | good |
| Nozzle tip abrasion amount (mg) | 0.93 | 1.05 | 0.03 | 0.03 | 0.10 | 0.02 |

EFFECT OF THE INVENTION

As described above, the phenol resin molding material of the present invention can provide a molded article which is excellent in resistance to abrasive dust and in heat shock resistance and is also excellent in mechanical strength, and is extremely suited for use as a material for a pulley because it reduces a load on production facilities.

The invention claimed is:

1. A resin pulley molded with a phenol resin molding material, the phenol resin molding material comprising 100 parts by weight of a resol phenolic resin, 40 to 100 parts by weight of an inorganic fiber, 30 to 90 parts by weight of a natural silica powder having an average particle size of 0.5 to 15 μm and subjected to a coupling agent treatment and 1 to 15 parts by weight of a rubber component as main components, wherein the inorganic fiber contains 50% by weight or more of a glass fiber, wherein the natural silica powder has a crushed shape, wherein the coupling agent is present in an amount of from 0.5 to 3 parts by weight based on 100 parts by weight of the silica powder and is selected from the group consisting of vinyltrichlorosilane, vinyltriethoxysilane, vinyltrimethoxysilane, γ-methacryloxypropyltrimethoxysilane, β(3,4-epoxycyclohexyl)ethyltrimethoxysilane, γ-glycidoxypropylmethyldiethoxysilane, N-β(aminoethyl)γ-aminopropyltrimethoxysilane, N-β(aminoethyl)γ-aminopropylmethyldimethoxysilane, γ-mercaptopropyltrimethoxysilane, γ-chloropropyltrimethoxysilane, isopropyltriisostearoyl titanate, tetraoctylbis(ditridecylphosphite)titanate, tetra(2,2-diallyloxymethyl-1-butyl)bis(ditridecyl)phosphate titanate, isopropyltri(N-aminoethyl-aminoethyl) titanate, bis(dioctyl pyrophosphate) oxyacetate titanate, isopropyltrioctanoyl titanate, isopropyltris(dioctylpyrophosphate)titanate, isopropyldimethacrylisostearoyl titanate, isopropyltridodecylbenzenesulfonyl titanate, isopropylisostearoyldiacryl titanate, tetraisopropylbis(dioctylphosphite)titanate, isopropyltricumylphenyl titanate, and combinations thereof.

2. A resin pulley molded with a phenol resin molding material, the phenol resin molding material comprising 100 parts by weight of a resol phenolic resin, 40 to 100 parts by weight of an inorganic fiber, 30 to 90 parts by weight of a natural silica powder having an average particle size of 0.5 to 15 μm and subjected to a coupling agent treatment and 1 to 15 parts by weight of a rubber component as main components, wherein the inorganic fiber contains 50% by weight or more of a glass fiber, wherein the natural silica powder has a crushed shape, wherein the coupling agent is present in an amount of from 0.5 to 3 parts by weight based on 100 parts by weight of the silica powder and is selected from the group consisting of vinyltrichlorosilane, vinyltriethoxysilane, vinyltrimethoxysilane, γ-methacryloxypropyltrimethoxysilane, β(3,4-epoxycyclohexyl)ethyltrimethoxysilane, γ-glycidoxypropyltrimethoxysilane, γ-glycidoxypropylmethyldiethoxysilane, N-β(aminoethyl)γ-aminopropyltrimethoxysilane, N-β(aminoethyl)γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, isopropyltriisostearoyl titanate, tetraoctylbis(ditridecylphosphite)titanate, tetra(2,2-diallyloxymethyl-1-butyl)bis(ditridecyl)phosphate titanate, isopropyltri (N-aminoethyl-amino ethyl) titanate, bis(dioctyl pyrophosphate)oxyacetate titanate, isopropyltrioctanoyl titanate, isopropyltris(dioctylpyrophosphate)titanate, isopropyldimethacrylisostearoyl titanate, isopropyltridodecylbenzenesulfonyl titanate, isopropylisostearoyldiacryl titanate, tetraisopropylbis(dioctylphosphite)titanate, isopropyltricumylphenyl titanate, and combinations thereof, and wherein the rubber component is selected from the group consisting of a nitrile rubber, acryl rubber, chloroprene rubber, styrene-butadiene rubber, and silicone rubber.

\* \* \* \* \*

UNITED STATES PATENT AND TRADEMARK OFFICE
CERTIFICATE OF CORRECTION

PATENT NO. : 8,962,734 B2  Page 1 of 1
APPLICATION NO. : 10/591516
DATED : February 24, 2015
INVENTOR(S) : Hirokazu Arai et al.

It is certified that error appears in the above-identified patent and that said Letters Patent is hereby corrected as shown below:

In the Claims

Col. 10, lines 14-15, Claim 2  Delete "isopropyltri (N-aminoethyl-amino ethyl)",
Insert -- isopropyltri(N-aminoethyl-aminoethyl) --

Signed and Sealed this
Fifteenth Day of September, 2015

Michelle K. Lee
*Director of the United States Patent and Trademark Office*